(12) United States Patent
Yang et al.

(10) Patent No.: US 11,051,342 B2
(45) Date of Patent: Jun. 29, 2021

(54) RANDOM ACCESS METHOD AND APPARATUS

(71) Applicant: GUANGDONG OPPO MOBILE TELECOMMUNICATIONS CORP., LTD., Guangdong (CN)

(72) Inventors: Ning Yang, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/463,066

(22) PCT Filed: Dec. 26, 2016

(86) PCT No.: PCT/CN2016/112211
§ 371 (c)(1),
(2) Date: May 22, 2019

(87) PCT Pub. No.: WO2018/119613
PCT Pub. Date: Jul. 5, 2018

(65) Prior Publication Data
US 2019/0281639 A1    Sep. 12, 2019

(51) Int. Cl.
*H04W 74/08*     (2009.01)
*H04W 72/04*     (2009.01)
*H04B 7/0408*    (2017.01)

(52) U.S. Cl.
CPC ... *H04W 74/0833* (2013.01); *H04W 72/0406* (2013.01); *H04B 7/0408* (2013.01); *H04W 72/046* (2013.01)

(58) Field of Classification Search
CPC .............. H04B 7/0408; H04B 7/0617; H04W 72/0406; H04W 72/046; H04W 74/0833; H04W 74/004; H04W 74/02
See application file for complete search history.

(56) References Cited

U.S. PATENT DOCUMENTS 9,900,891 B1*  2/2018  Islam ..................... H04B 7/04
9,941,939 B2*  4/2018  Park ................. H04W 74/0833
(Continued)

FOREIGN PATENT DOCUMENTS

CN    101316134    12/2008
CN    101370270    2/2009
(Continued)

OTHER PUBLICATIONS

Chen et al., "Distributed Mobility Solutions for 5G New Radio", Sep. 28, 2016, Convida Wireless, LLC, U.S. Appl. No. 62/401,078, Total Pages: 133 (Year: 2016).*
(Continued)

*Primary Examiner* — Un C Cho
*Assistant Examiner* — Shah M Rahman
(74) *Attorney, Agent, or Firm* — Hodgson Russ LLP (57) ABSTRACT

Embodiments of the present application provide a random access method and apparatus. The method includes: in a random access process, a terminal sends a first random access signal by means of a first resource first, and then sends a second random access signal by means of a second resource; and the terminal receives at least one of a first random access response signal and a second random access response signal, a start time of a transmission time period of the second random access signal being earlier than an end time of a detection time of the first random access response signal.

17 Claims, 4 Drawing Sheets

(56) References Cited

U.S. PATENT DOCUMENTS

| | | | |
|---|---|---|---|
| 2008/0253297 A1* | 10/2008 | Hulbert | H04W 16/28 370/252 |
| 2013/0242730 A1* | 9/2013 | Pelletier | H04W 28/0284 370/230 |
| 2014/0177607 A1* | 6/2014 | Li | H04W 52/42 370/336 |
| 2014/0254515 A1* | 9/2014 | Kim | H04W 74/0833 370/329 |
| 2015/0201448 A1* | 7/2015 | Yang | H04W 36/0022 370/329 |
| 2016/0135147 A1* | 5/2016 | Ouchi | H04W 72/042 370/329 |
| 2016/0227575 A1 | 8/2016 | Furuskog et al. | |
| 2016/0262109 A1* | 9/2016 | Chen | H04W 4/70 |
| 2016/0302234 A1 | 10/2016 | Tarradell et al. | |
| 2016/0353440 A1* | 12/2016 | Lee | H04W 72/0453 |
| 2016/0381712 A1* | 12/2016 | Yang | H04W 74/0833 370/329 |
| 2017/0033854 A1* | 2/2017 | Yoo | H04W 24/00 |
| 2017/0251460 A1* | 8/2017 | Agiwal | H04W 72/0406 |
| 2017/0331577 A1* | 11/2017 | Parkvall | H04L 29/06231 |
| 2017/0332407 A1* | 11/2017 | Islam | H04W 52/242 |
| 2018/0007667 A1* | 1/2018 | You | H04W 72/12 |
| 2018/0138962 A1* | 5/2018 | Islam | H04L 5/0032 |
| 2018/0359790 A1* | 12/2018 | Ingale | H04W 28/16 |
| 2019/0319686 A1* | 10/2019 | Chen, IV | H04W 72/046 |
| 2019/0350008 A1* | 11/2019 | Axen | H04W 74/006 |
| 2020/0296765 A1* | 9/2020 | Kim | H04W 74/0833 |

FOREIGN PATENT DOCUMENTS

| | | |
|---|---|---|
| CN | 101478778 | 7/2009 |
| CN | 101088303 | 1/2011 |
| CN | 102548012 | 7/2012 |
| CN | 105027524 | 11/2015 |
| CN | 105122662 | 12/2015 |
| WO | 2010110522 | 9/2010 |
| WO | 2015061948 | 5/2015 |
| WO | 2016045715 | 3/2016 |
| WO | 2016086144 | 6/2016 |

OTHER PUBLICATIONS

Interdigital, "Random access aspects for beam-based NR initial access," 3GPP TSG-RAN WG1 #86, R1-167333, Aug. 2016, 3 pages.

Samsung, "Random Access Procedure in NR," 3GPP TSG-RAN WG2 Meeting #95, R2-164695, Aug. 2016, 7 pages.

ZTE Microelectronics, "WF on Message 2 reception window," 3GPP TSG RAN WG1 Meeting #87, R1-1613716, Nov. 2016, 4 pages.

EPO, Office Action for EP Application No. 16924999.2, dated Sep. 25, 2019.

Ericsson, "RA Response Window start time for TDD," 3GPP TSG-RAN WG2 #63, Tdoc R2-083901, Aug. 2008.

WIPO, ISR for PCT/CN2016/112211, Jun. 7, 2017.

CNIPA, First Office Action for CN Application No. 201680091424.0, dated Feb. 3, 2020.

CNIPA, Second Office Action for CN Application No. 201680091424.0, dated Mar. 23, 2020.

"3rd Generation Partnership Project; Technical Specification Group Radio Access Network; Evolved Universal Terrestrial Radio Access (E-UTRA); Medium Access Control (MAC) protocol specification (Release 13)," 3GPP TS 36.321, Dec. 2015, v.13.0.0, 82 pages.

"3rd Generation Partnership Project; Technical Specification Group Radio Access Network; Evolved Universal Terrestrial Radio Access (E-UTRA); Radio Resource Control (RRC); Protocol specification (Release 13)," 3GPP TS 36.331, Dec. 2015, v.13.0.0, 507 pages.

NTT Docomo, Inc., "Design for RACH Procedure for NR," 3GPP TSG RAN WG1 Meeting #86, R1-167378, Aug. 2016, 4 pages.

EPO, Extended European Search Report for EP Application No. 20187456.7, dated Nov. 18, 2020.

ZTE et al., "Unified random access in NR," 3GPP TSG RAN WG1 Meeting #86b, R1-1608968, Oct. 2016, 5 pages.

* cited by examiner

RANDOM ACCESS METHOD AND APPARATUS

CROSS-REFERENCE TO RELATED APPLICATION

This application is a U.S. national phase application of International Application No. PCT/CN2016/112211, filed Dec. 26, 2016, the entire disclosure of which is incorporated herein by reference.

TECHNICAL FIELD

The embodiments of the present application relate to the communication field, and more particularly, to a random access method and apparatus.

BACKGROUND

In the existing random access process of the Long Term Evolution (LTE) system, after a terminal sends a random access signal to a network device, since the network device needs to detect the random access signal, the terminal needs to wait for a certain delay to detect random access response information sent by the network device in a time window. Only when the terminal does not detect the random access response information in the time window, the terminal could resend the random access signal and perform the random access process again.

In the existing random access process mechanism, since the terminal needs to resend the random access signal after the end of the time window, if the terminal needs to attempt random access multiple times, it will cause a large delay.

SUMMARY

The present application provides a random access method and apparatus to reduce the time delay of the terminal for performing random access for multiple times.

According to a first aspect, there is provided a method for random access method, including: in a random access process, sending a first random access signal via a first resource, and then sending a second random access signal via a second resource, by a terminal; and detecting, by the terminal, at least one of a first random access response signal and a second random access response signal sent by a network device, a start time of a transmission period of the second random access signal being earlier than an end time of a detection period of the first random access response signal.

By configuring that the start time of the transmission period of the second random access signal is earlier than the end time of the detection period of the first random access response signal, the problem in the related art is avoided that the terminal cannot send the second random access signal via the second resource until a time window for detecting the random access response signal is ended, so that the terminal can send the second random access signal to the network device before the detection period for detecting the first random access response signal is ended, thereby reducing the time delay of the terminal for performing random access for multiple times.

In combination with the first aspect, in a possible implementation manner of the first aspect, the detection period of the first random access response signal and a detection period of the second random access response signal at least partially overlap.

In combination with the first aspect, in a possible implementation manner of the first aspect, the first random access signal is sent by a first beam, and the second random access signal is sent by a second beam.

The terminal may transmit different random access signals by different beams, so that the terminal can determine the corresponding beam according to the random signal.

In combination with the first aspect, in a possible implementation manner of the first aspect, the first resource includes at least one of a time domain resource, frequency domain resource and a code domain resource, and the second resource includes at least one of a time domain resource, a frequency domain resource and a code domain resource.

In combination with the first aspect, in a possible implementation manner of the first aspect, the first random access signal and the second random access signal are preamble signals.

In combination with the first aspect, in a possible implementation manner of the first aspect, the method further includes: determining, by the terminal, an uplink target beam according to the first random access response signal and/or the second random access response signal; and communicating, by the terminal, with the network device by the uplink target beam to complete the random access process of the terminal.

The uplink target beam may be determined by the terminal from the first beam corresponding to the first random access response signal and/or the second beam corresponding to the second random access response signal, and the terminal can communicate with the network device by the uplink target beam to improve the success rate of completing the random access process by the terminal.

In combination with the first aspect, in a possible implementation manner of the first aspect, the method further includes: detecting, by the terminal, first control information of the first random access response signal and/or second control information of the second random access response signal sent by the network device; and the determining, by the terminal, the uplink target beam according to the received first random access response signal and/or second random access response signal, including: determining, by the terminal, the uplink target beam from the first beam and/or the second beam according to the first control information corresponding to the first random access response signal and/or the second control information corresponding to the second random access response signal.

The uplink target beam may be determined by the terminal according to the first control information and/or the second control information, and the terminal may communicate with the network device by the uplink target beam to improve the success rate of completing the random access process by the terminal.

In combination with the first aspect, in a possible implementation manner of the first aspect, the determining, by the terminal, the uplink target beam from the first beam and/or the second beam according to the first control information corresponding to the first random access response signal and/or the second control information corresponding to the second random access response signal, includes: determining, by the terminal, the uplink target beam according to a first Random Access-Radio Network Temporary Identity (RA-RNTI) carried by the first control information and/or a second RA-RNTI carried by the second control information.

According to a second aspect, there is provided a method for random access method, including: in a random access process, detecting a first random access signal via a first resource, and then detecting a second random access signal via a second resource, by a network device; and sending, by the network device, at least one of a first random access response signal and a second random access response signal, a start time of a transmission period of the second random access signal being earlier than an end time of a sending period of the first random access response signal.

By configuring that the start time of the transmission period of the second random access signal is earlier than then end time of the detection period of the first random access response signal, the problem in the related art is avoid that the terminal cannot send the second random access signal by the second resource until a time window for detecting the random access response signal is ended, so that the terminal can send the second random access signal to the network device before the detection period for detecting the first random access response signal is ended, thereby reducing the time delay of the terminal for performing random access for multiple times.

In combination with the second aspect, in a possible implementation manner of the second aspect, the sending period of the first random access response signal and a sending period of the second random access response signal at least partially overlap.

In combination with the second aspect, in a possible implementation manner of the second aspect, the first random access signal is sent by a first beam, and the second random access signal is sent by a second beam.

The terminal can transmit different random access signals by different beams, so that the terminal can determine the corresponding beam according to the random signal.

In combination with the second aspect, in a possible implementation manner of the second aspect, the first resource includes at least one of a time domain resource, a frequency domain resource and a code domain resource, the second resource includes at least one of a time domain resource, a frequency domain resource and a code domain resource.

In combination with the second aspect, in a possible implementation manner of the second aspect, the first random access signal and the second random access signal are preamble signals.

In combination with the second aspect, in a possible implementation manner of the second aspect, the method further includes: sending, by the network device, first control information of the first random access response signal and/or second control information of the second random access response signal; and communicating, by the network device, with the terminal by receiving an uplink target beam to complete the random access process of the terminal, the uplink target beam being a first beam determined by the first control information or a second beam determined by using the second control information.

The uplink target beam may be determined by the terminal from the first beam corresponding to the first random access response signal and/or the second beam corresponding to the second random access response signal, and the terminal can communicate with the network device through the uplink target beam to improve the success rate of completing the random access process by the terminal.

In combination with the second aspect, in a possible implementation manner of the second aspect, the first control information carries a first Random Access-Radio Network Temporary Identity (RA-RNTI) and/or the second control information carries a second RA-RNTI, the first RA-RNTI is used to indicate the first beam, and the second RA-RNTI is used to indicate the second beam.

According to a third aspect, there is provided an apparatus including a module for performing the method of the first aspect.

According to a fourth aspect, there is provided an apparatus including a module for performing the method of the second aspect.

According to a fifth aspect, there is provided an apparatus including a transceiver and a processor, and the processor performs the method of the first aspect based on the transceiver.

According to a sixth aspect, there is provided a network device including a transceiver and a processor, and the processor performs the method of the second aspect based on the transceiver.

According to a seventh aspect, there is provided a computer readable medium, the computer readable medium stores program code for execution by a terminal device, and the program code includes instructions for performing the method of the first aspect.

According to an eighth aspect, there is provided a computer readable medium, the computer readable medium stores program code for execution by a network device, and the program code includes instructions for performing the method of the second aspect.

DETAILED DESCRIPTION

The technical solutions in the embodiments of the present application will be described below with reference to the accompanying drawings.

Figure 1:
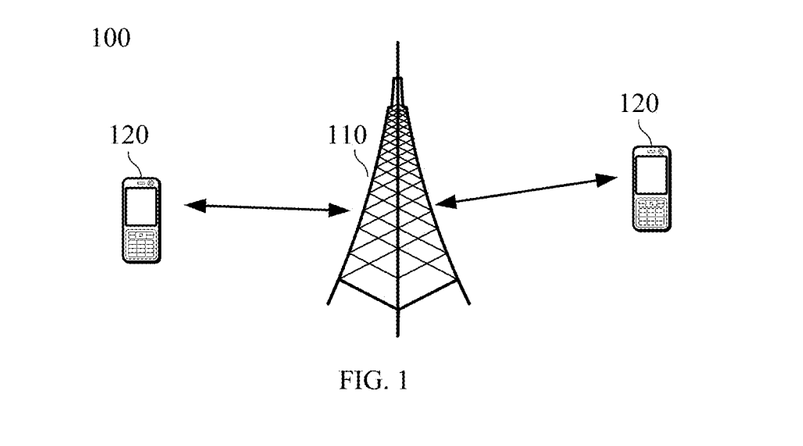
FIG. 1 illustrates a wireless communication system 100 to which embodiments of the present application are applied.

FIG. 1 illustrates a wireless communication system 100 to which the embodiments of the present application are applied. The wireless communication system 100 may include a network device 110. The network device 110 may be a device which communicates with the terminal device. The network device 100 may provide communication coverage for a particular geographic area and may communicate with the terminal device located within the coverage area.

FIG. 1 exemplarily shows one network device and two terminals. Optionally, the wireless communication system 100 may include a plurality of network devices and other number of terminals may be included in the coverage of each network device, which is not limited in the embodiment of the present application.

Optionally, the wireless communication system 100 may further include other network entities such as a network controller, and a mobility management entity, which is not limited in the embodiment of the present application.

It should be understood that the technical solutions of the present application may be applied to various communication systems, for example, a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) System, a Universal Mobile Telecommunication System (UMTS), New Radio Access Technology (NR), 5G, and the like.

It should be understood that, in the embodiments of the present disclosure, the terminal device may include, but is not limited to, a Mobile Station (MS), a Mobile Terminal, a Mobile Telephone, User Equipment (UE), a handset and a portable equipment, etc. The terminal device may communicate with one or more core networks via a Radio Access Network (RAN), for example, the terminal device may be a mobile phone (or "cellular" phone), a computer with a wireless communication function, etc., and the terminal device may also be a portable, pocket, handheld, computer built-in or vehicle-mounted mobile device.

In the embodiments of the present disclosure, the network device may be an access network device, for example, may be a base station, a Transmit and Receive Point (TRP) or an access point, and the base station may be a Base Transceiver Station (BTS) in GSM or CDMA, or a base station (NodeB) in WCDMA, or an evolved base station (evolved Node B, eNB or e-NodeB) in LTE, or a base station of NR or 5G (gNB), which is not limited in the embodiment of the present application.

Figure 2:
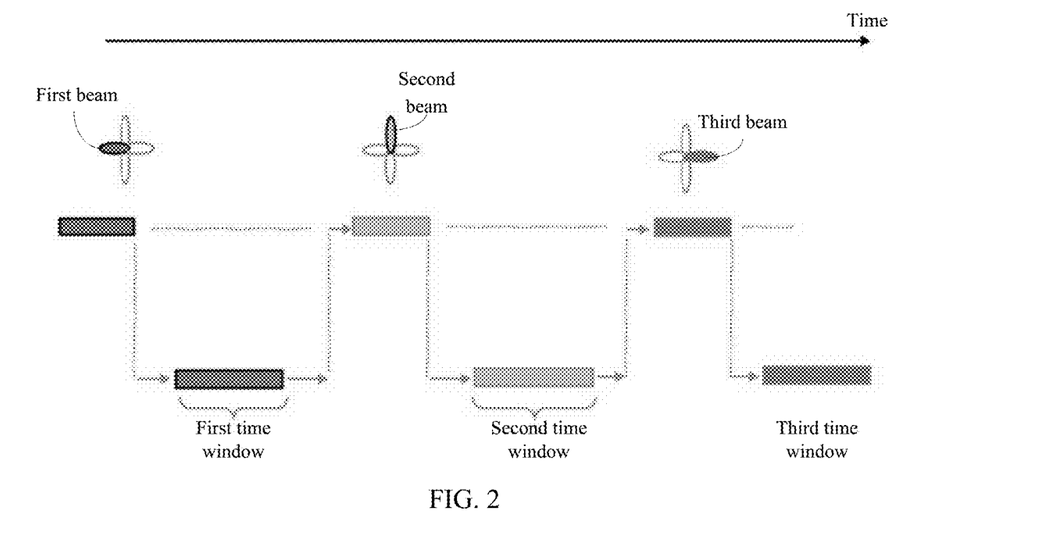
FIG. 2 is a schematic diagram of a random access method according to an embodiment of the present application.

FIG. 2 is a schematic diagram of a random access method according to an embodiment of the present application. In the existing LTE system, the first step of the terminal for performing the random access process is that the terminal sends a random access signal (also referred to as a random access preamble signal) to the network device. The terminal may use the beam forming technology in the random access process. However, if the beam direction selected by the terminal is inaccurate, the signal quality of the random access signal received by the network device may be reduced, even the random access signal cannot be received by the network device, and finally the terminal cannot complete the random access. At this time, in order to improve the quality of communication between the terminal and the network device, the terminal may allocate different random access signals for different beams, and then the terminal transmits the random access signal corresponding to each beam through different beams. As can be seen from the schematic diagram of the random access method shown in FIG. 2, the terminal can sequentially transmit different random access signals by different beams. For example, after the terminal sends a first random access signal by a first beam, the terminal may detect a first random access response signal corresponding to the first random access signal in a first time window corresponding to the first random access signal. If the first random access response signal is not detected by the terminal in the first time window, the terminal may send a second random access signal by a second beam, and the terminal may detect a second random access response signal corresponding to the second random access signal in a second time window.

However, the above random access mechanism may lead to a too long delay of random access of the terminal. The terminal needs to send the second random access signal by the second beam after waiting for the end of the time window to start the next round of random access process. The above random access mechanism may cause a relatively long delay when the terminal attempts to perform the random access process for many times, and cannot meet the transmission requirement of the service having a relatively high delay requirement.

Figure 3:
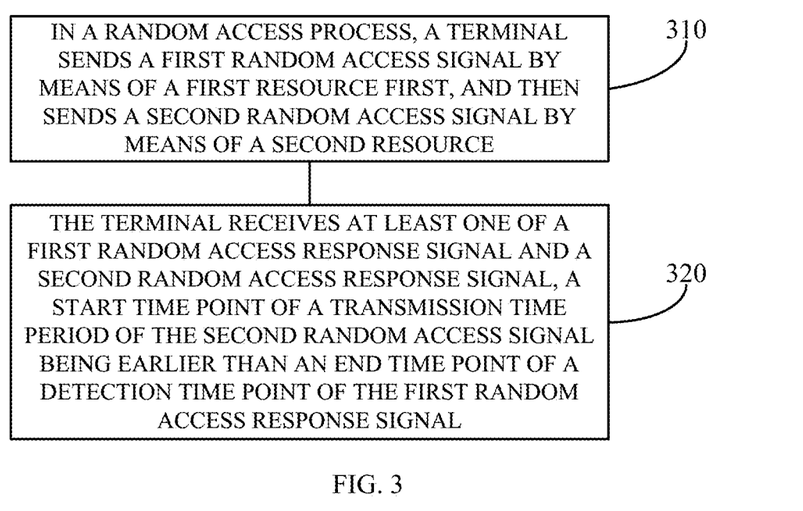
FIG. 3 is a schematic flowchart of a random access method according to an embodiment of the present application.

FIG. 3 is a schematic flowchart of a random access method according to an embodiment of the present application. The method shown in FIG. 3 includes the following steps.

In 310, in a random access process, a terminal sends a first random access signal by a first resource, and then sends a second random access signal by a second resource.

Specifically, the terminal sends the first random access signal by the first resource, which may mean that the terminal sends the first random access signal by a first wave speed, and the terminal sends the second random access signal by the second resource, which may mean that the terminal sends the second random access signal by a second wave speed.

The terminal sends the first random access signal by the first resource, and then sends the second random access signal by the second resource, where the terminal may sequentially send the first random signal by the first resource and send the second random signal by the second resource.

Optionally, the first random access signal and the second random access signal are preamble signals.

In 320, the terminal receives at least one of a first random access response signal and a second random access response signal sent by the network device, a start time of a transmission period of the second random access signal being earlier than an end time of a detection period of the first random access response signal.

Specifically, the terminal may detect the first random access response signal, and when determining that the first random access response signal is a random access response signal of the first random access signal sent by the terminal, the terminal may stop detecting the random access response signal sent by the network device. The terminal may continue to receive the second random access response signal of the second random access signal sent by the network device after determining that the first random access response signal is a random access response signal of the first random access signal sent by the terminal.

Optionally, the detection period of the first random access response signal and the detection period of the second random access response signal at least partially overlap.

Specifically, the detection period of the above first random access response signal may be a time window for detecting the first random access response signal by the terminal, the detection period of the above second random access response signal may be a time window for detecting the second random access response signal by the terminal. That is, the above time window for detecting the first random access response signal and the above time window for detecting the second random access response signal may be at least partially overlapped in time.

Optionally, the first random access signal is sent by a first beam, and the second random access signal is sent by a second beam.

Specifically, the first random access signal may be sent on the first resource and by the first beam, and the second random access signal may be sent on the second resource and by the second beam.

The first resource may be at least one of a time domain resource, a frequency domain resource, and a code domain resource, and the second resource may be at least one of a time domain resource, a frequency domain resource, and a code domain resource.

Optionally, as an embodiment, the method further includes: determining, by the terminal, an uplink target beam according to the first random access response signal and/or the second random access response signal; and communicating, by the terminal, with the network device by the uplink target beam to complete a random access process of the terminal.

For example, the terminal may send next information of the random access process, such as a connection setup request (MSG3), by the uplink target beam. Since the uplink target beam may be an uplink beam with a relatively good signal quality of transmitting the random access signal among multiple beams, by using the uplink target beam to transmit the MSG3, the signal transmission quality can be ensured, and the successful completion of the random access process can be facilitated.

Optionally, as an embodiment, the method further includes: detecting, by the terminal, first control information of the first random access response signal and/or second control information of the second random access response signal sent by the network device; and the determining, by the terminal, the uplink target beam according to the first random access response signal and/or the second random access response signal received, includes: determining, by the terminal, an uplink target beam from the first beam and/or the second beam according to the first control information corresponding to the first random access response signal and/or the second control information corresponding to the second random access response signal.

Optionally, as an embodiment, the determining, by the terminal, the uplink target beam from the first beam and/or the second beam according to the first control information corresponding to the first random access response signal and/or the second control information corresponding to the second random access response signal, includes: determining, by the terminal, the uplink target beam according to a first Random Access-Radio Network Temporary Identity (RA-RNTI) carried by the first control information and/or a second RA-RNTI carried by the second control information.

Specifically, if the first random access response signal is a response signal with respect to the first random access signal sent by the terminal, the second random access response signal is a response signal with respect to the second random access signal sent by the terminal, and if the terminal may successfully receive the first random access response signal and/or the second random access response signal, the terminal may determine a first beam for sending the first random access signal and/or a second beam for sending the second random access signal according to the first control information corresponding to the first random access response signal and/or the second control information corresponding to the second random access response signal. The terminal may select an uplink target beam from the first beam and/or the second beam, and use information included in the first random access response signal and/or the second random access response signal that has been successfully received, such as a timing advance and a resource allocated by the network device, to complete the random access process of the terminal and the subsequent uplink transmission between the terminal and the network device.

Optionally, the terminal may select an uplink target beam from the first beam and the second beam, and the beam except the uplink target beam may be used as an alternative beam by the terminal. When the target beam is invalid, the terminal may communicate with the network device through the alternative beam.

Optionally, the terminal may select a beam with a relatively good signal transmission quality from the first beam and the second beam as the uplink target beam, according to the signal quality of the first random access response signal and the second random access response signal.

Optionally, the terminal may detect multiple random access response signals in one scheduling unit (for example, one time window), and the terminal may also determine the accuracy of the information carried by the random access response signal and whether there is another random access terminal that has a random access competition with this terminal, according to the content of different random access response signals received.

Specifically, if three random access response signals are detected by the terminal, and if the time adjustment information carried in the three random access response signals, for example, Timing Advance (TA), is consistent, then the terminal may determine that the information carried by the three random access response signals is relatively accurate. If the TA values carried by two random access response signals (for example, the first random access response signal and the second random access response signal) in the above three random access response signals are consistent, but are inconsistent with the TA value carried by the other random access response signal, the terminal may determine that the random access response signal carrying the TA value inconsistent with the other two random access response signals is sent to another terminal, and said another terminal has a competition-based access relationship with this terminal. The terminal may send a Radio Resource Control (RRC) access request by using the resource allocated by the network device carried in the first two random access response signals, and adjust the sending time of the uplink data by using the TA carried in the first random access response signal and the second random access response signal.

For another example, after the first random access response signal sent by the network device is detected by the terminal in the first scheduling unit (for example, at least a part of a random access response detection window), the terminal may further detect other scheduling units after the first scheduling unit. If the second random access response signal sent by the network device is detected by the terminal in another scheduling unit, a received signal strength of the second random access response signal is stronger, and there are fewer other terminals that have contention-based random access with the terminal (for example, the terminal may roughly estimate the number of other terminals that are in a contention-based random access relationship according to the different TA values carried in the random access response signals received in the second window), then the terminal may determine the beam of transmitting the second random access signal as the uplink target beam.

Figure 4:
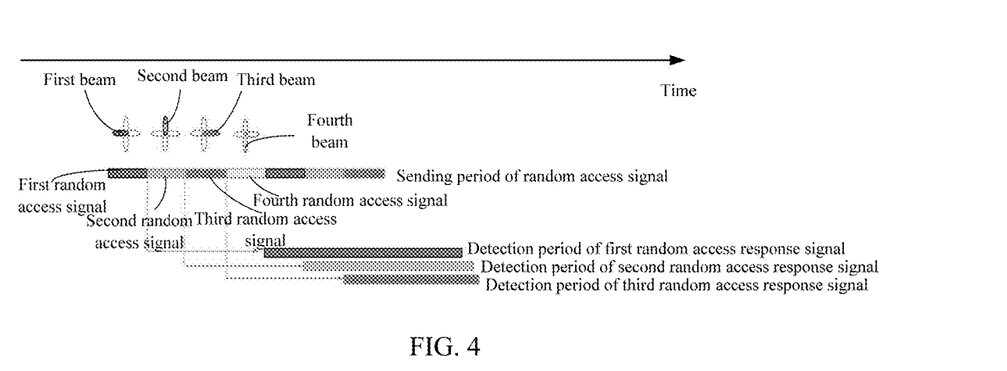
FIG. 4 is a schematic diagram of a method for random access according to another embodiment of the present application.

FIG. 4 is a schematic diagram of a method for random access according to another embodiment of the present application. In the random access method shown in FIG. 4, the terminal sends random access signals to the network device by different beams respectively (the first beam, the second beam, the third beam, and the fourth beam in FIG. 4). From the detection periods of the random access response signals for the random access signals transmitted by different beams shown in FIG. 4, it can be seen that the detection periods of the random access response signals for the random access signals transmitted by different beams at least partially overlap in time. (Referring to the detection period of the first random access response signal, the detection period of the second random access response signal, and the detection period of the third random access response signal shown in FIG. 4), the terminal may detect a plurality of random access response signals sent by the network device from a start time of the detection period of the first random access response signal to an end time of the detection period of the third random access response signal, and determine a target random access response signals from the plurality of random access response signals.

Figure 5:
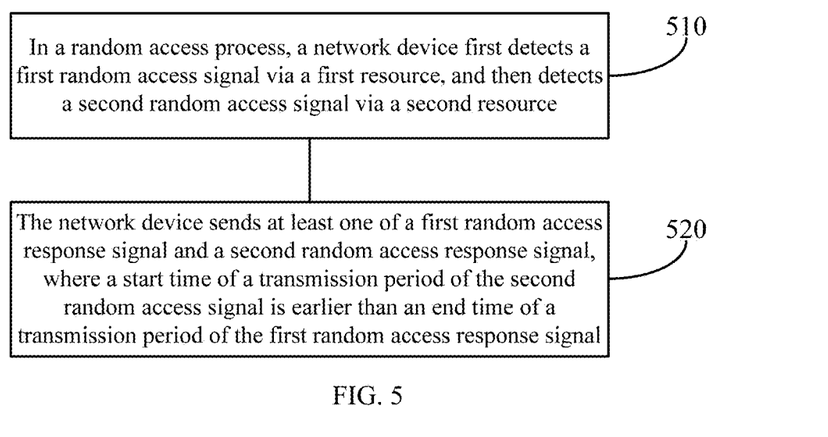
FIG. 5 is a schematic flowchart of a method for random access according to an embodiment of the present application.

FIG. 5 is a schematic flowchart of a method for random access according to an embodiment of the present application. The method shown in FIG. 5 includes the following steps.

In 510, in a random access process, the network device detects a first random access signal by a first resource, and then detects a second random access signal by a second resource.

The network device detects the first random access signal by the first resource, and then detects the second random access signal by the second resource, which may mean that the terminal sequentially detects the first random signal on the first resource and the second random signal on the second resource.

In 520, the network device sends at least one of a first random access response signal and a second random access response signal, where a start time of a transmission period of the second random access signal is earlier than an end time of a sending period of the first random access response signal.

Specifically, the sending period of the first random access response signal mentioned above may refer to a detection period during which the terminal detects the first random access response signal.

Optionally, as an embodiment, the sending period of the first random access response signal and the sending period of the second random access response signal at least partially overlap.

Specifically, the sending period of the first random access response signal and the sending period of the second random access response signal at least partially overlap, which may mean that the detection period of detecting the first random access response signal and the detection period of detecting the second random access response signal by the terminal are at least partially overlapped.

Optionally, as an embodiment, the first random access signal is sent by a first beam of the terminal, and the second random access signal is sent by a second beam of the terminal.

Optionally, as an embodiment, the first resource includes at least one of a time domain resource, a frequency domain resource, and a code domain resource, and the second resource includes at least one of a time domain resource, a frequency domain resource, and a code domain resource.

Optionally, as an embodiment, the first random access signal and the second random access signal are preamble signals.

Optionally, as an embodiment, the method further includes: sending, by the network device, first control information of the first random access response signal and/or second control information of the second random access response signal; and communicating, by the network device, with the terminal by receiving an uplink target beam to complete the random access process of the terminal, the uplink target beam being a first beam determined by the first control information or a second beam determined by using the second control information.

Optionally, as an embodiment, the first control information carries a first RA-RNTI and/or the second control information carries the second RA-RNTI, where the first RA-RNTI is used to indicate the first beam, and the second RA-RNTI is used to indicate the second beam.

The method of random access in the embodiments of the present application is described in detail above with reference to FIG. 1 to FIG. 5, and the apparatus of random access in the embodiments of the present application will be described in detail below with reference to FIG. 6 to FIG. 9. It should be understood that the apparatus shown in FIG. 6 to FIG. 9 can implement the various steps in FIG. 3, and details are not described here again to avoid repetition.

Figure 6:
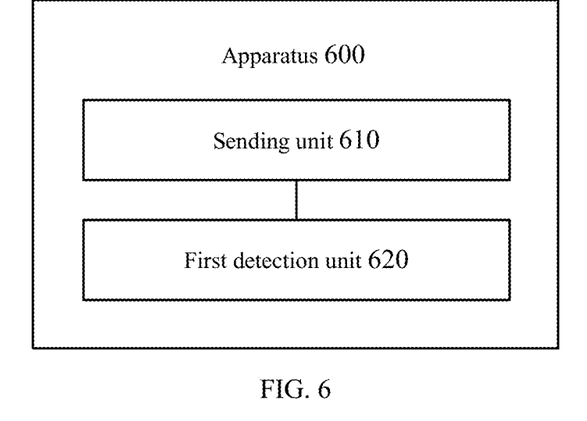
FIG. 6 is a schematic block diagram of a random access apparatus according to an embodiment of the present application.

FIG. 6 is a schematic block diagram of a random access apparatus according to an embodiment of the present application. The apparatus 600 shown in FIG. 6 includes: a sending unit 610 and a first detection unit 620.

The sending unit 610 is configured to, in a random access process, send a first random access signal by a first resource, and then send a second random access signal by a second resource.

The first detection unit 620 is configured to detect at least one of the first random access response signal and the second random access response signal sent by the network device, wherein a starting time of a transmission period of the second random access signal is earlier than an ending time of a detection period of the first random access response signal.

Optionally, as an embodiment, the detection period of the first random access response signal and the detection period of the second random access response signal at least partially overlap.

Optionally, as an embodiment, the first random access signal is sent by a first beam, and the second random access signal is sent by a second beam.

Optionally, as an embodiment, the first resource includes at least one of a time domain resource, a frequency domain resource, and a code domain resource, and the second resource includes at least one of a time domain resource, a frequency domain resource, and a code domain resource.

Optionally, as an embodiment, the first random access signal and the second random access signal are preamble signals.

Optionally, as an embodiment, the apparatus further includes: a determination unit, configured to determine an uplink target beam, according to the first random access response signal and/or the second random access response signal; and a communication unit, configured to communicate with the network device by using the uplink target beam to complete the random access process of the terminal.

Optionally, as an embodiment, the apparatus further includes: a second detection unit, configured to detect first control information of the first random access response signal and/or second control information of the second random access response signal which are sent by the network device; and the determination unit is specifically configured to determine the uplink target beam from the first beam and/or the second beam according to the first control information corresponding to the first random access response signal received and/or the second control information corresponding to the second random access response signal received.

Optionally, as an embodiment, the determination unit is further configured to determine the uplink target beam according to a first Random Access-Radio Network Temporary Identifier (RA-RNTI) carried by the first control information and/or a second RA-RNTI carried by the second control information.

Figure 7:
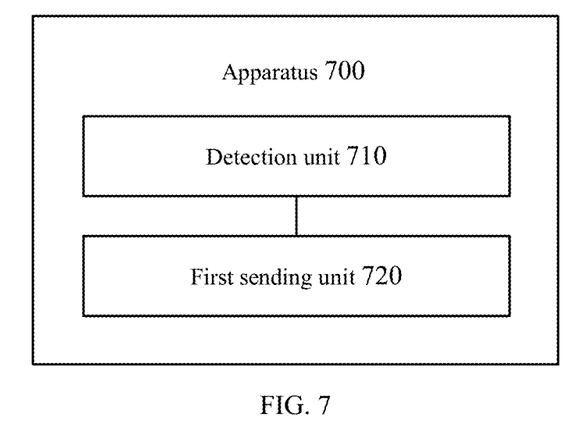
FIG. 7 is a schematic block diagram of a random access apparatus according to an embodiment of the present application.

FIG. 7 is a schematic block diagram of a random access apparatus according to an embodiment of the present application. The apparatus shown in FIG. 7 includes: a detection unit 710, and a first sending unit 720.

The detection unit 710 is configured to detect a first random access signal through a first resource, and then detect a second random access signal by a second resource in a random access process.

The first sending unit 720 is configured to send at least one of the first random access response signal and the second random access response signal, where a start time of a transmission period of the second random access signal is earlier than an end time of a sending period of the first random access response signal.

Optionally, as an embodiment, the sending period of the first random access response signal and the sending period of the second random access response signal at least partially overlap.

Optionally, as an embodiment, the first random access signal is sent by a first beam of the terminal, and the second random access signal is sent by a second beam of the terminal.

Optionally, as an embodiment, the first resource includes at least one of a time domain resource, a frequency domain resource, and a code domain resource, and the second resource includes at least one of a time domain resource, a frequency domain resource, and a code domain resource.

Optionally, as an embodiment, the first random access signal and the second random access signal are preamble signals.

Optionally, as an embodiment, the apparatus further includes: a second sending unit, configured to send first control information of the first random access response signal and/or second control information of the second random access response signal; and a communication unit, configured to communicate with the terminal by receiving an uplink target beam, to complete the random access process of the terminal, where the uplink target beam is a first beam determined by the first control information or a second beam determined by the second control information.

Optionally, as an embodiment, the first control information carries a first Random Access-Radio Network Temporary Identifier (RA-RNTI) and/or the second control information carries a second RA-RNTI, where the first RA-RNTI is configured to indicate the first beam, and the second RA-RNTI is used to indicate the second beam.

Figure 8:
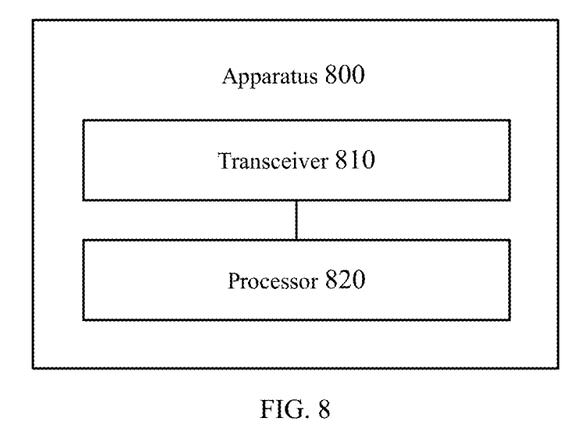
FIG. 8 is a schematic block diagram of a random access apparatus according to an embodiment of the present application.

FIG. 8 is a schematic block diagram of a random access apparatus according to an embodiment of the present application. The apparatus 800 shown in FIG. 8 includes: a transceiver 810 and a processor 820.

The transceiver 810 is configured to send a first random access signal through a first resource first, and then send a second random access signal through a second resource in a random access process.

The processor 820 is configured to detect at least one of a first random access response signal and a second random access response signal sent by a network device, where a starting time of a transmission period of the second random access signal is earlier than an ending time of a detection period of the first random access response signal.

Optionally, as an embodiment, the detection period of the first random access response signal and a detection period of the second random access response signal at least partially overlap.

Optionally, as an embodiment, the first random access signal is sent by a first beam, and the second random access signal is sent by a second beam.

Optionally, as an embodiment, the first resource includes at least one of a time domain resource, a frequency domain resource, and a code domain resource, and the second resource includes at least one of a time domain resource, a frequency domain resource, and a code domain resource.

Optionally, as an embodiment, the first random access signal and the second random access signal are preamble signals.

Optionally, as an embodiment, the apparatus further includes: the processor being configured to determine an uplink target beam, according to the first random access response signal and/or the second random access response signal received; and the transceiver being configured to communicate with the network device by using the uplink target beam to complete the random access process of the terminal.

Optionally, as an embodiment, the apparatus further includes: the processor being configured to detect first control information of the first random access response signal and/or second control information of the second random access response signal which are sent by the network device; and determine the uplink target beam from the first beam and/or the second beam according to the first control information corresponding to the first random access response signal received and/or the second control information corresponding to the second random access response signal received.

Optionally, as an embodiment, the determination unit is further configured to determine the uplink target beam according to a first Random Access-Radio Network Temporary Identity (RA-RNTI) carried by the first control information and/or a second RA-RNTI carried by the second control information.

Figure 9:
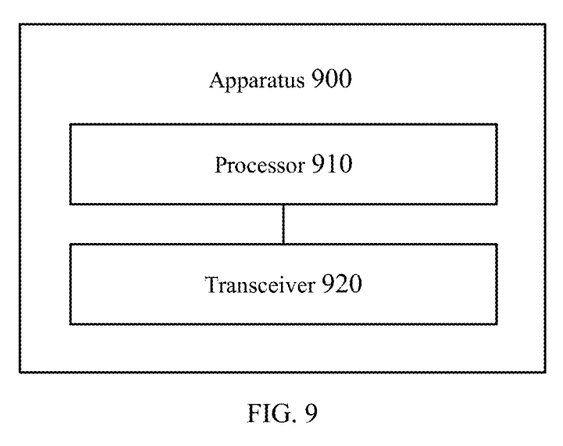
FIG. 9 is a schematic block diagram of a random access apparatus according to an embodiment of the present application.

FIG. 9 is a schematic block diagram of a random access apparatus according to an embodiment of the present application. The apparatus 900 shown in FIG. 9 includes: a processor 910 and a transceiver 920.

The processor 910 is configured to detect a first random access signal by a first resource, and then detect a second random access signal through a second resource in a random access process.

The transceiver 920 is configured to send at least one of a first random access response signal and a second random access response signal sent by the network device, wherein a starting time of a transmission period of the second random access signal is earlier than an ending time of a detection period of the first random access response signal.

Optionally, as an embodiment, the detection period of the first random access response signal and a detection period of the second random access response signal at least partially overlap.

Optionally, as an embodiment, the first random access signal is sent by a first beam, and the second random access signal is sent by a second beam.

Optionally, as an embodiment, the first resource includes at least one of a time domain resource, a frequency domain resource, and a code domain resource, and the second resource includes at least one of a time domain resource, a frequency domain resource, and a code domain resource.

Optionally, as an embodiment, the first random access signal and the second random access signal are preamble signals.

Optionally, as an embodiment, the apparatus further includes: the transceiver 920 being configured to send first control information of the first random access response signal and/or second control information of the second random access response signal; and configured to communicate with the terminal by an uplink target beam, to complete the random access process of the terminal, where the target beam is a first beam corresponding to the first control information or a second beam corresponding to the second control information.

Optionally, as an embodiment, the first control information carries a first Random Access-Radio Network Temporary Identity (RA-RNTI) and/or the second control information carries a second RA-RNTI, where the first RA-RNTI is used to indicate the first beam, and the second RA-RNTI is used to indicate the second beam.

It should be understood that in the embodiments of the present application, "B corresponding to A" means that B is associated with A, and B can be determined according to A. However, it should also be understood that determining B from A does not mean that B is only determined based on A, and B can also be determined based on A and/or other information.

It should be understood that the term "and/or" herein is merely used for describing an association relationship of associated objects, and indicates that there may be three relationships, for example, A and/or B, may represent three situations: A exists alone, A and B coexist, and B exists alone. In addition, the character "/" herein generally indicates that the contextual objects are of an "or" relationship.

It should be understood that in various embodiments of the present application, the size of the sequence numbers of the above-mentioned processes does not mean the order of execution, and the order of execution of each process should be determined by its function and internal logic, and should not constitute any limitation on the implementation process of the embodiments of the present application.

In the several embodiments provided in the present application, it should be understood that the disclosed systems, apparatuses and methods may be implemented in other ways. For example, the apparatus embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, apparatuses or units, and may be in electrical, mechanical or other forms.

The units described as separated parts may or may not be physically separated, and the parts displayed as units may or may not be physical units, that is, may be located in one place, or may be distributed on multiple network units. Some or all of the units may be selected according to actual needs to achieve the objectives of the solutions in the embodiments.

In addition, individual functional units in individual embodiments of the present application may be integrated in one processing unit, or individual units may exist alone physically, or two or more units may be integrated into one unit.

The functions may also be stored in a computer-readable storage medium if being implemented in the form of a software functional unit and sold or used as an independent product. Based on such understanding, the essence of the technical solutions of the present application, or the part contributing to the related art or all or a part of the technical solutions, may be embodied in the form of a software product. The computer software product is stored in storage medium including a number of instructions such that a computer device (which may be a personal computer, a server, or a network device, etc.) performs all or a part of steps of the method described in each of the embodiments of the present application. The foregoing storage medium includes: any medium that is capable of storing program codes such as a USB disk, a mobile hard disk, a Read-Only Memory (ROM), a Random Access Memory (RAM), a magnetic disk or an optical disk, and the like.

What is claimed is:

1. A random access method, comprising:
   in a random access process, sending a first random access signal via a first resource, and then sending a second random access signal via a second resource, by a terminal; and
   detecting, by the terminal, at least one of a first random access response signal and a second random access response signal sent by a network device, a start time of a transmission period of the second random access signal being earlier than an end time of a detection period of the first random access response signal,
   wherein, the first random access signal is sent by a first beam, and the second random access signal is sent by a second beam, and
   wherein the terminal selects an uplink target beam from the first beam and the second beam according to a received signal strength of at least one of the first random access response signal and the second random access response signal and Timing Advance (TA) values carried in at least one of the first random access response signal and the second random access response signal, and the terminal selects an alternative beam from the first beam and the second beam, the alternative beam used by the terminal to communicate with the network device when the uplink target beam is invalid.

2. The method according to claim 1, wherein, the detection period of the first random access response signal and a detection period of the second random access response signal at least partially overlap.

3. The method according to claim 1, wherein, the first resource comprises at least one of a time domain resource, a frequency domain resource, and a code domain resource, and the second resource comprises at least one of a time domain resource, a frequency domain resource, and a code domain resource.

4. The method according to claim 1, wherein, the first random access signal and the second random access signal are preamble signals.

5. The method according to claim 1, further comprising:
   determining, by the terminal, an uplink target beam according to the first random access response signal and/or the second random access response signal; and
   communicating, by the terminal, with the network device by the uplink target beam to complete the random access process of the terminal.

6. The method according to claim 5, further comprising:
  detecting, by the terminal, first control information of the first random access response signal and/or second control information of the second random access response signal sent by the network device; and
  the determining, by the terminal, the uplink target beam according to the received first random access response signal and/or second random access response signal, comprising:
  determining, by the terminal, the uplink target beam from the first beam and/or the second beam according to the first control information corresponding to the first random access response signal and/or the second control information corresponding to the second random access response signal.

7. The method according to claim 6, wherein, the determining, by the terminal, the uplink target beam from the first beam and/or the second beam according to the first control information corresponding to the first random access response signal and/or the second control information corresponding to the second random access response signal, comprises:
  determining, by the terminal, the uplink target beam according to a first Random Access-Radio Network Temporary Identity (RA-RNTI) carried by the first control information and/or a second RA-RNTI carried by the second control information.

8. A random access apparatus, comprising:
  a processor; and
  a memory for storing instructions executable by the processor;
  wherein the processor is configured to:
  in a random access process, send a first random access signal via a first resource, and then send a second random access signal via a second resource, and
  detect at least one of a first random access response signal and a second random access response signal sent by a network device, a start time of a transmission period of the second random access signal being earlier than an end time of a detection period of the first random access response signal,
  wherein, the first random access signal is sent by a first beam, and the second random access signal is sent by a second beam, and
  wherein the processor is further configured to: select an uplink target beam from the first beam and the second beam according to a received signal strength of at least one of the first random access response signal and the second random access response signal and Timing Advance (TA) values carried in at least one of the first random access response signal and the second random access response signal, and use another of the first beam and second beam as an alternative beam to communicate with the network device when the uplink target beam is invalid.

9. The apparatus according to claim 8, wherein, the detection period of the first random access response signal and a detection period of the second random access response signal at least partially overlap.

10. The apparatus according to claim 8, wherein, the first resource comprises at least one of a time domain resource, a frequency domain resource, and a code domain resource, and the second resource comprises at least one of a time domain resource, a frequency domain resource, and a code domain resource.

11. The apparatus according to claim 8, wherein, the first random access signal and the second random access signal are preamble signals.

12. The apparatus according to claim 8, wherein the processor is further configured to:
  determine an uplink target beam according to the first random access response signal and/or the second random access response signal; and
  communicate with the network device by the uplink target beam to complete the random access process of the random access apparatus.

13. The apparatus according to claim 12, wherein the processor is further configured to:
  detect first control information of the first random access response signal and/or second control information of the second random access response signal which are sent by the network device; and
  determine the uplink target beam from the first beam and/or the second beam according to the received first control information corresponding to the first random access response signal received and/or second control information corresponding to the second random access response signal.

14. The apparatus according to claim 13, wherein, the processor is further configured to:
  determine the uplink target beam according to a first Random Access-Radio Network Temporary Identity (RA-RNTI) carried by the first control information and/or a second RARNTI carried by the second control information.

15. A random access apparatus, comprising:
  a processor; and
  a memory for storing instructions executable by the processor;
  wherein the processor is configured to:
  in a random access process, detect a first random access signal via a first resource and then detect a second random access signal via a second resource, and
  send at least one of a first random access response signal and a second random access response signal, a start time of a transmission period of the second random access signal being earlier than an end time of a sending period of the first random access response signal,
  wherein, the first random access signal is sent by a first beam of a terminal, and the second random access signal is sent by a second beam of the terminal, and
  wherein an uplink target beam is selected by the terminal from the first beam and the second beam according to a received signal strength of at least one of the first random access response signal and the second random access response signal and Timing Advance (TA) values carried in at least one of the first random access response signal and the second random access response signal, and an alternative beam is selected by the terminal from another of the first beam and the second beam, the alternative beam used by the terminal to communicate with the network device when the uplink target beam is invalid.

16. The apparatus according to claim 15, wherein, the sending period of the first random access response signal and a sending period of the second random access response signal at least partially overlap.

17. The apparatus according to claim 15, wherein, the first resource comprises at least one of a time domain resource, a frequency domain resource, and a code domain resource, and the second resource comprises at least one of a time domain resource, a frequency domain resource, and a code domain resource.

* * * * *